United States Patent
Hong

(10) Patent No.: US 11,109,431 B2
(45) Date of Patent: Aug. 31, 2021

(54) METHOD AND APPARATUS FOR ESTABLISHING QUICK CONNECTION BETWEEN INTERNET OF THINGS DEVICES, AND DEVICE

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 34 days.

(21) Appl. No.: 16/606,635

(22) PCT Filed: Jul. 6, 2017

(86) PCT No.: PCT/CN2017/092077
§ 371 (c)(1),
(2) Date: Oct. 18, 2019

(87) PCT Pub. No.: WO2019/006728
PCT Pub. Date: Jan. 10, 2019

(65) Prior Publication Data
US 2020/0045759 A1    Feb. 6, 2020

(51) Int. Cl.
*H04W 76/14* (2018.01)
*H04W 4/70* (2018.01)
*H04W 72/00* (2009.01)

(52) U.S. Cl.
CPC ............ *H04W 76/14* (2018.02); *H04W 4/70* (2018.02); *H04W 72/005* (2013.01)

(58) Field of Classification Search
CPC ...... H04W 76/14; H04W 4/70; H04W 72/005
(Continued)

(56) References Cited

U.S. PATENT DOCUMENTS 9,781,556 B2 * 10/2017 Johnsson .............. H04W 4/021
9,900,172 B2 *  2/2018 Goel .................... H04L 12/2838
(Continued)

FOREIGN PATENT DOCUMENTS

CN    102547590 A    7/2012
CN    103517371 A    1/2014
(Continued)

OTHER PUBLICATIONS

International Search Report and Written Opinion in the international application No. PCT/CN2017/092077 dated Mar. 27, 2018, (7p).
(Continued)

*Primary Examiner* — Mong-Thuy T Tran
(74) *Attorney, Agent, or Firm* — Arch & Lake LLP

(57) ABSTRACT

A method and apparatus are provided for establishing a quick connection between Internet of things devices, and a device. The method may include: when it needs to establish a quick connection, broadcasting a first message on the basis of a Device to Device (D2D) resource, the first message carrying a quick connection request of a source device; monitoring a first response message corresponding to the first message; and establishing a quick connection with a target device on the basis of the first response message. The present technical solution allows a source device to broadcast a quick connection request by means of a D2D resource, and then allows a target device having an intention to establish a quick connection to directly perform signaling interaction with the source device, so as to guide the source device and the target device to establish a quick connection.

10 Claims, 13 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2014/0022986 A1 | 1/2014 | Wu et al. | |
| 2015/0127733 A1* | 5/2015 | Ding | H04W 8/005 |
| | | | 709/204 |
| 2016/0128043 A1* | 5/2016 | Shuman | H04W 4/029 |
| | | | 370/331 |
| 2016/0302062 A1 | 10/2016 | Lehtovirta et al. | |
| 2016/0353416 A1* | 12/2016 | Takano | H04W 8/005 |
| 2017/0064736 A1* | 3/2017 | Yu | H04W 74/0833 |
| 2017/0374642 A1* | 12/2017 | Lee | H04W 72/02 |
| 2018/0241570 A1* | 8/2018 | Pang | H04L 9/3247 |
| 2018/0324823 A1* | 11/2018 | Martin | H04W 76/14 |
| 2019/0379508 A1* | 12/2019 | Xiang | H04W 72/0446 |

FOREIGN PATENT DOCUMENTS

| | | |
|---|---|---|
| CN | 104798432 A | 7/2015 |
| CN | 105338548 A | 2/2016 |
| CN | 106134232 A | 11/2016 |
| CN | 106535301 A | 3/2017 |
| EP | 2939493 A1 | 11/2015 |
| WO | 2014014990 A1 | 1/2014 |
| WO | 2015133816 A1 | 9/2015 |

OTHER PUBLICATIONS

The International Search Report and Written Opinion issued in PCT Application No. PCT/CN2017/092077, dated Mar. 27, 2018, and English Translation (9p).

First Office Action of the Chinese Application No. 201780000777.X, dated Jun. 1, 2020, (17p).

* cited by examiner

METHOD AND APPARATUS FOR ESTABLISHING QUICK CONNECTION BETWEEN INTERNET OF THINGS DEVICES, AND DEVICE

CROSS REFERENCE TO RELATED APPLICATIONS

The present application is the U.S. national phase of PCT Application No. PCT/CN2017/092077 filed on Jul. 6, 2017, which is incorporated herein by reference in its entirety.

TECHNICAL FIELD

The present disclosure generally relates to the technical field of cellular Internet of things, and more particularly, to a method, device and apparatus for establishing a quick connection between Internet of things devices.

BACKGROUND

The Internet of things connects all objects with the Internet through information sensing devices such as a radio frequency identification device, an infrared sensor, a global positioning system and a laser scanner according to predetermined protocols, for information exchange and communication to implement intelligent identification, positioning, tracking, monitoring and management. The Internet of things, as the main driving force for development of mobile communication, may be applied to various major fields to fully implement interconnection of everything. For meeting a connection requirement for a massive Internet of things device, each standardization organization defines the Internet of things standard to support Internet of things devices. For example, the 3rd Generation Partnership Project (3GPP) defines a licensed frequency band-based Enhanced Machine Type Communication (e-MTC) technology, a Narrow Band Internet of Things (NB-IoT) technology and the like in a Radio Access Network (RAN). For implementing quick connection, configuration and networking of different Internet of things devices, the Wireless-Fidelity (Wi-Fi) alliance (WFA) defines the Device Provisioning Protocol (DPP) technology.

In the related art, the DPP technology may implement information guidance for establishing a quick connection between Internet of things devices with five guidance methods such as matrix QR code, Near Field Communication (NFC), Wi-Fi aware, Bluetooth Low Energy (BLE) and user entered string. With development of cellular Internet of things technologies, more and more Internet of things devices support the cellular Internet of things technologies. The five guidance methods for the DPP technology in the related art are limitative, which increases difficulties in popularization of the Internet of things devices supporting the cellular Internet of things technology to a certain extent.

SUMMARY

For solving the problem in the related art, a method, an apparatus and a device for establishing a quick connection between Internet of things devices are provided according to the embodiments of the present disclosure, to implement guidance between cellular Internet of things-based Internet of things devices and further improve efficiency of establishing a quick connection between the cellular Internet of things devices.

According to a first aspect of the embodiments of the present disclosure, a method for establishing a quick connection between Internet of things devices is provided, which is applied to a source device and include operations as follows, When a quick connection is required to be established, a first message is broadcasted based on a device to device (D2D) resource. The first message contains a quick connection request of the source device;

A first response message corresponding to the first message is monitored.

A quick connection with a target device is established based on the first response message.

In an embodiment, the operation that the first response message corresponding to the first message is monitored may include an operation as follows.

The first response message which is sent by the target device based on the first message and is used for acquiring guidance information of the source device is monitored.

In an embodiment, the operation that the quick connection with the target device is established based on the first response message may include an operation as follows.

A second response message is sent to the target device based on the first response message. The second response message contains guidance information of the source device.

In an embodiment, the operation that the first response message corresponding to the first message is monitored may include an operation as follows.

The first response message which is sent by the target device based on the first message and contains guidance information of the target device is monitored.

In an embodiment, the operation that the quick connection with the target device is established based on the first response message may include an operation as follows.

The first response message is parsed to obtain the guidance information of the target device; and The quick connection with the target device is established based on the guidance information of the target device.

In an embodiment, the first message may contain device identification information of the target device with which the source device is to establish the quick connection.

In an embodiment, the operation that the first message is broadcasted based on the D2D source may include an operation as follows.

A cellular Internet of things base station is requested for the D2D resource; and The first message is broadcasted based on the D2D resource allocated by the cellular Internet of things base station.

According to a second aspect of the embodiments of the present disclosure, a method for establishing a quick connection between Internet of things devices is provided, which is applied to a target device and include operations as follows.

A first message broadcasted by a source device is received. The first message contains a quick connection request of the source device.

A first response message is returned based on the first message. The first response message is used to establish a quick connection with the source device.

In an embodiment, the operation that the first response message is returned based on the first message may include an operation.

The first response message used for acquiring guidance information of the source device is sent to the source device.

In an embodiment, the method may further include operations as follows.

A second response message returned by the source device based on the first response message is monitored.

The second response message is parsed to obtain guidance information of the source device.

The quick connection with the source device is established based on the guidance information of the source device.

In an embodiment, the operation that the first response message is returned based on the first message may include an operation.

The first response message including guidance information of the target device is sent to the source device. The guidance information of the target device is used by the source device to establish the quick connection with the target device.

According to a third aspect of the embodiments of the present disclosure, a device for establishing a quick connection between Internet of things devices is provided, which is applied to a source device and includes a broadcasting module, a first monitoring module and a first connecting module.

The broadcasting module is configured to, when a quick connection is required to be established, broadcast a first message based on a D2D resource. The first message contains a quick connection request of the source device.

The first monitoring module is configured to monitor a first response message corresponding to the first message broadcasted by the broadcasting module.

The first connecting module is configured to establish a quick connection with a target device based on the first response message monitored by the first monitoring module.

In an embodiment, the first monitoring module may include a first monitoring submodule.

The first monitoring submodule is configured to monitor the first response message which is sent by the target device based on the first message and is used for acquiring guidance information of the source device.

In an embodiment, the first connecting module may include a first sending submodule.

The first sending submodule is configured to send a second response message to the target device based on the first response message. The second response message contains guidance information of the source device.

In an embodiment, the first monitoring module may include a second monitoring submodule.

The second monitoring submodule is configured to monitor the first response message which is sent by the target device based on the first message and contains guidance information of the target device.

In an embodiment, the first connecting module may include a parsing submodule and an establishing submodule.

The parsing submodule is configured to parse the first response message to obtain the guidance information of the target device.

The establishing submodule is configured to establish a quick connection with the target device based on the guidance information of the target device which is obtained by parsing from the parsing submodule.

In an embodiment, the first message may contain device identification information of the target device with which the source device is to establish the quick connection.

In an embodiment, the broadcasting module may include a second sending submodule and a broadcasting submodule.

The second sending submodule is configured to request a cellular Internet of things base station for the D2D resource.

The broadcasting submodule is configured to broadcast the first message based on the D2D resource allocated by the cellular Internet of things base station.

According to a fourth aspect of the embodiments of the present disclosure, a device for establishing a quick connection between Internet of things devices is provided, which is applied to a target device and includes a receiving module and a response module.

The receiving module is configured to receive a first message broadcasted by a source device. The first message contains a quick connection request of the source device.

The response module is configured to return a first response message based on the first message received by the receiving module. The first response message is used to establish a quick connection with the source device.

In an embodiment, the response module may include a third sending module.

The third sending submodule is configured to send the first response message used for acquiring guidance information of the source device to the source device.

In an embodiment, the device may further include a second monitoring module, a parsing module and a second connecting module.

The second monitoring module is configured to monitor a second response message returned by the source device based on the first response message.

The parsing module is configured to parse the second response message monitored by the second monitoring module to obtain guidance information of the source device.

The second connecting module is configured to establish a quick connection with the source device based on the guidance information of the source device.

In an embodiment, the response module may include a fourth sending submodule.

The fourth sending submodule is configured to send the first response message containing guidance information of the target device to the source device. The guidance information of the target device is used by the source device to establish a quick connection with the target device.

According to a fifth aspect of the embodiments of the present disclosure, a user device is provided, which may include:

a processor; and a memory configured to store processor-executable instructions, wherein the processor is configured to:

when a quick connection is required to be established, broadcast a first message based on a D2D resource, where the first message contains a quick connection request of a source device;

monitor a first response message corresponding to the first message; and establish a quick connection with a target device based on the first response message.

According to a sixth aspect of the embodiments of the present disclosure, a user device is provided, which may include:

a processor; and a memory configured to store processor-executable instructions, wherein the processor is configured to:

receive a first message broadcasted by a source device, where the first message contains a quick connection request of the source device; and return a first response message based on the first message, where the first response message is used to establish a quick connection with the source device.

According to a seventh aspect of the embodiments of the present disclosure, a computer-readable storage medium is provided, in which a computer instruction is stored. The instruction, when being executed by a processor, implements the following steps.

When a quick connection is required to be established, a first message is broadcasted based on a D2D resource. The first message contains a quick connection request of a source device.

A first response message corresponding to the first message is monitored.

A quick connection with a target device is established based on the first response message.

According to an eighth aspect of the embodiments of the present disclosure, a computer-readable storage medium is provided, in which a computer instruction may be stored. The instruction, when being executed by a processor, implements the following steps.

A first message broadcasted by a source device is received. The first message contains a quick connection request of the source device.

A first response message is returned based on the first message. The first response message is used to establish a quick connection with the source device.

The technical solutions provided by the embodiments of the present disclosure may have the following beneficial effects.

The source device, when a quick connection is required to be established, may broadcast the first message containing the quick connection request based on the device to device (D2D) resource and, in a case that the first response message of the target device for the first message is monitored, establishes a quick connection with the target device. Since the source device broadcasts the quick connection request through the D2D resource, the target device intended to establish the quick connection may further directly perform signaling interaction with the source device, to implement guidance for the source device and the target device and further establish the quick connection.

It is to be understood that the above general descriptions and the following detailed descriptions are only exemplary and explanatory, rather than limiting the present disclosure.

BRIEF DESCRIPTION OF THE DRAWINGS

The accompanying drawings, which are incorporated in and constitute a part of the specification, illustrate embodiments of the present disclosure, and, together with the description, are used to explain the principles of the present disclosure.

DETAILED DESCRIPTION

Exemplary embodiments are illustrated in detail here, examples of which are shown in the accompanying drawings. In the following description, reference is made to the accompanying drawings, in which the same numbers in different drawings represent the same or similar elements unless otherwise stated. The implementations described in the following exemplary embodiments do not represent all implementations consistent with the present disclosure. Instead, the implementations are merely examples of devices and methods consistent with some aspects of the present disclosure as recited in the appended claims.

Figure 1A:
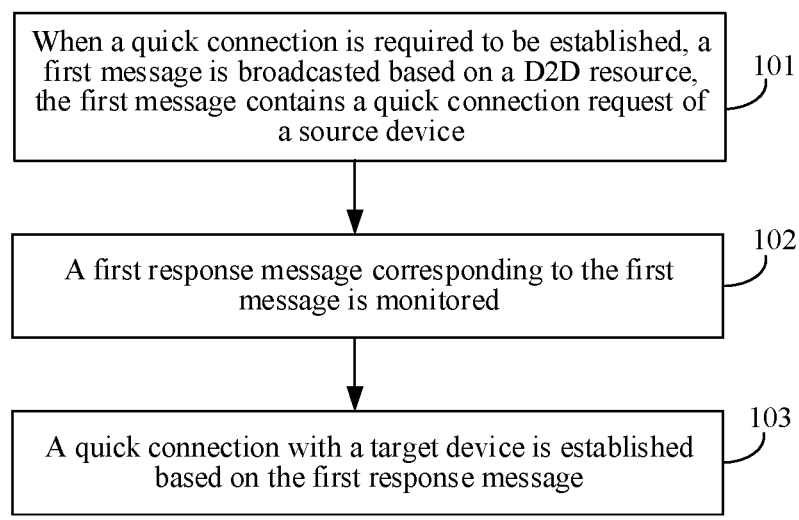
FIG. 1A is a flow chart of a method for establishing a quick connection between Internet of things devices according to an exemplary embodiment.
Figure 1B:
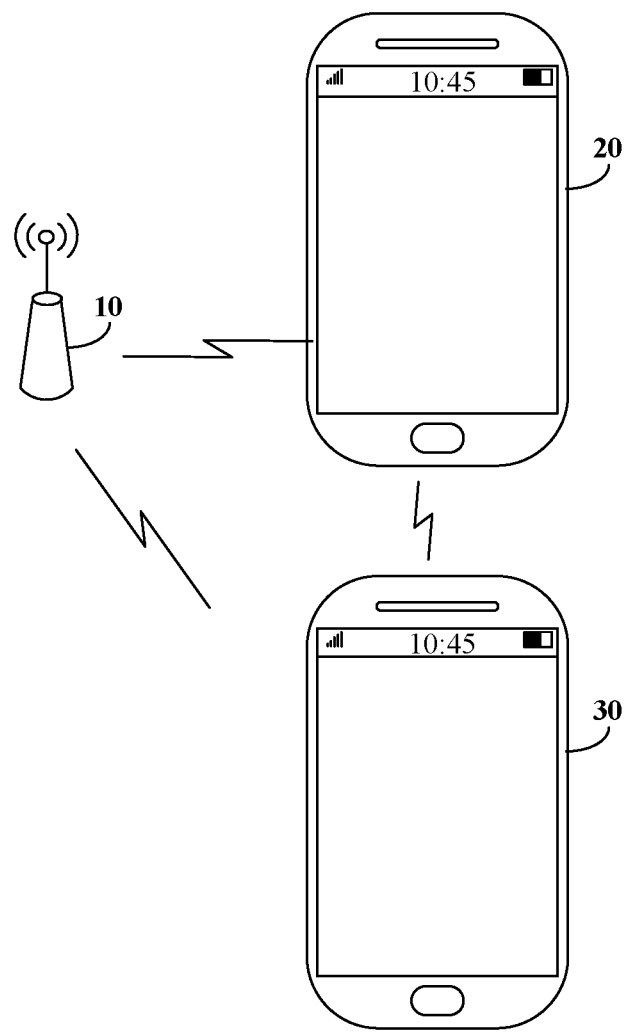
FIG. 1B is a scenario diagram showing a method for establishing a quick connection between Internet of things devices according to an exemplary embodiment.

FIG. 1A is a flow chart of a method for establishing a quick connection between Internet of things devices according to an exemplary embodiment. FIG. 1B is a scenario diagram showing a method for establishing a quick connection between Internet of things devices according to an exemplary embodiment. The method for establishing the quick connection between the Internet of things devices may be applied to a source device. As shown in FIG. 1A, the method for establishing the quick connection between the Internet of things devices includes steps 101-103 as follows.

In step 101, when a quick connection is required to be established, a first message is broadcasted based on a D2D resource. The first message contains a quick connection request of the source device.

In an embodiment, the D2D resource may include a frequency-domain resource and a time-domain resource.

In an embodiment, when a quick connection is required to be established, the source device may request a cellular Internet of things base station for the D2D resource and, after the D2D resource is allocated by the cellular Internet of things base station, broadcasts the first message based on the allocated D2D resource.

In an embodiment, the quick connection request of the source device contained in the first message may be considered as indication information in the first message for indicating the source device is intended to establish the quick connection.

In an embodiment, the first message may further contain device identification information of the target device, and the target device, upon receiving the first message, may return a first response message. In an embodiment, if a user presently knows a target device intended to establish the quick connection with the source device, the user may enter the target device to be connected into the source device. For example, if the user is intended to control a flat screen television using a smart phone, device identification information of the flat screen television may directly be entered into the smart phone, in this way, the first message of the smart phone contains the device identification information of the target device.

In step 102, a first response message corresponding to the first message is monitored.

Figure 2:
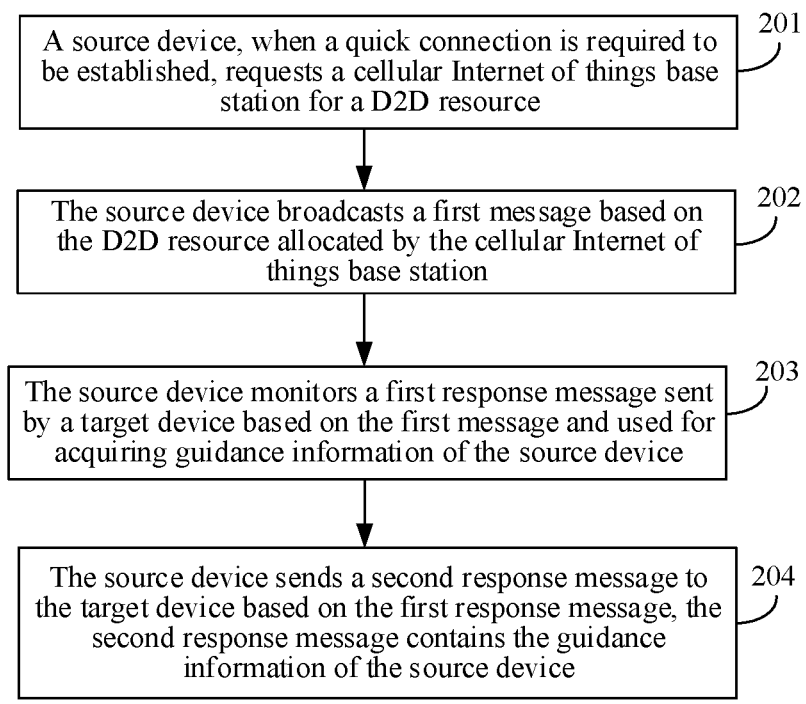
FIG. 2 is a flow chart of another method for establishing a quick connection between Internet of things devices according to an exemplary embodiment.

In an embodiment, the first response message may be a message used for requesting guidance information of the source device, which is not elaborated herein and reference may be made to the embodiment shown in FIG. 2.

Figure 3:
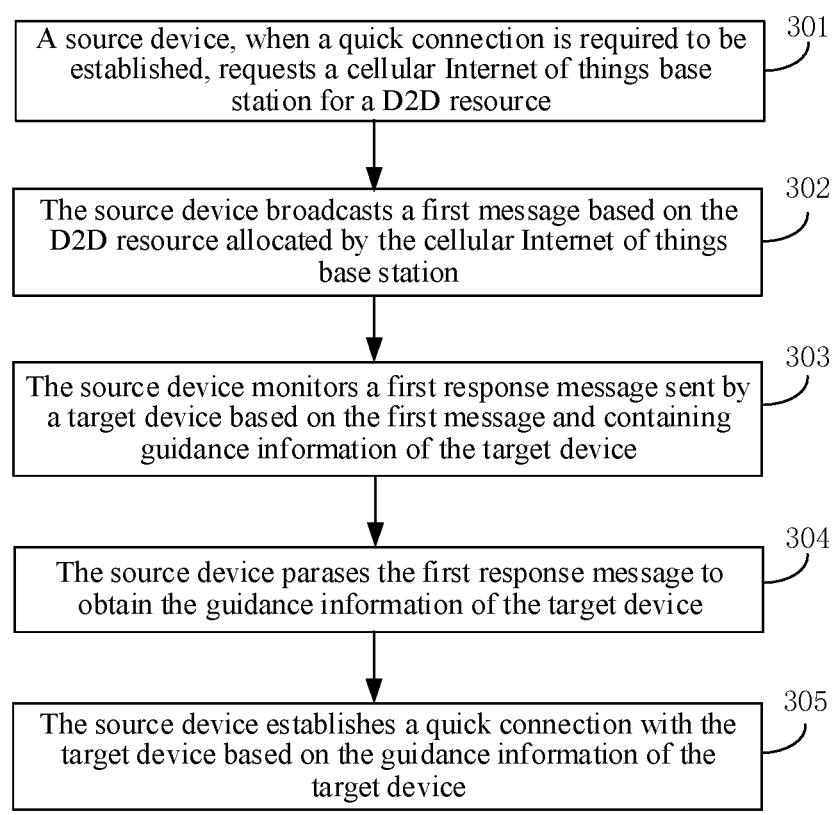
FIG. 3 is a flow chart of another method for establishing a quick connection between Internet of things devices according to an exemplary embodiment.

In an embodiment, the first response message may contain guidance information of the target device, which is not elaborated herein and reference may be made to the embodiment shown in FIG. 3.

In an embodiment, the guidance information may be necessary information required by DPP authentication and configuration, for example, a public bootstrap key and/or a global operating class and/or a channel number list.

In step 103, a quick connection with a target device is established based on the first response message.

In an embodiment, through step 102, guidance between the source device and the target device may be implemented, and the source device and the target device may execute a series of flows such as DPP authentication, DPP configuration and network access based on the guidance information, thereby establishing the quick connection.

In an embodiment, more than one target device may be intended to establish a quick connection with the source device.

An exemplary scenario is as shown in FIG. 1B. The scenario shown in FIG. 1B includes a cellular Internet of things base station 10, a source device (the source device may be an electronic device supporting the cellular Internet of things, for example, a smart phone and a tablet computer) 20 and a target device 30 (the target device may be an electronic device supporting the cellular Internet of things, for example, a smart phone, a tablet computer, a television and a humidifier, the flat screen television is taken as a schematic example of the target device). There may be more than one target device. The source device 20, when a quick connection is required to be established, acquires a D2D resource from the cellular Internet of things base station 10 and further broadcasts a first message. Upon the first message is monitored, the target device 30 may return a first response message to implement guidance between the source device 20 and the target device 30 and further establish the quick connection.

According to the embodiment, through the above steps 101-103, the target device intended to establish the quick connection may directly perform signaling interaction with the source device to implement guidance between the source device and the target device, and further establish the quick connection.

In an embodiment, the operation that the first response message corresponding to the first message is monitored includes an operation as follows.

The first response message which is sent by the target device based on the first message and is used for acquiring guidance information of the source device is monitored.

In an embodiment, the operation that the quick connection with the target device is established based on the first response message includes an operation as follows.

A second response message is sent to the target device based on the first response message. The second response message contains guidance information of the source device.

In an embodiment, the operation that the first response message corresponding to the first message is monitored includes an operation as follows.

The first response message which is sent by the target device based on the first message and contains the guidance information of the target device is monitored.

In an embodiment, the operation that the quick connection with the target device is established based on the first response message includes operations as follows.

The first response message is parsed to obtain the guidance information of the target device; and The quick connection with the target device is established based on the guidance information of the target device.

In an embodiment, the first message contains device identification information of the target device with which the source device is to establish the quick connection.

Here, the device identification information of the target device may be entered by the user, and the user may actively enter device identification information of the target device to be connected into the source device.

In an embodiment, the operation that the first message is broadcasted based on the D2D source includes operations as follows.

A cellular Internet of things base station is requested for the D2D resource.

The first message is broadcasted based on the D2D resource allocated by the cellular Internet of things base station.

About establishing the quick connection between the Internet of things devices reference may be made to subsequent embodiments.

The technical solution provided in the embodiment of the present disclosure is described below with specific embodiments.

FIG. 2 is a flow chart of another method for establishing a quick connection between Internet of things devices according to an exemplary embodiment. In the embodiment, the above method according to the embodiment of the present disclosure is illustrated with taking a case that the source device sends guidance information of the source device to the target device to establish a quick connection between the source device and the target device as an example. As shown in FIG. 2, the method includes the following steps 201 to 204.

In step 201, the source device, when a quick connection is required to be established, requests a cellular Internet of things base station for a D2D resource.

In step 202, the source device broadcasts a first message based on the D2D resource allocated by the cellular Internet of things base station.

In step 203, the source device monitors a first response message which is sent by the target device based on the first message and is used for acquiring guidance information of the source device.

In an embodiment, the first response message is used to request for the guidance information of the source device.

In step 204, the source device sends a second response message to the target device based on the first response message. The second response message contains guidance information of the source device.

In an embodiment, the target device may establish a quick connection with the source device based on the guidance information of the source device in the second response message.

In the embodiment, through the above steps 201-204, the target device may acquire the guidance information of the source device, and the target device further actively establishes the quick connection with the source device based on the guidance information of the source device.

FIG. 3 is a flow chart of another method for establishing a quick connection between Internet of things devices according to an exemplary embodiment. In the embodiment, the above method according to the embodiment of the present disclosure is illustrated with taking a case that the target device sends guidance information of the target device to the source device to establish a quick connection between the source device and the target device as an example. As shown in FIG. 3, the method includes the following steps 301 to 305.

In step 301, the source device, when a quick connection is required to be established, requests a cellular Internet of things base station for a D2D resource.

In step 302, the source device broadcasts a first message based on the D2D resource allocated by the cellular Internet of things base station.

In step 303, the source device monitors a first response message which is sent by the target device based on the first message and contains guidance information of the target device.

In an embodiment, the target device may make the guidance information of the target device be contained in the first response message.

In step 304, the source device parses the first response message to obtain the guidance information of the target device.

In step 305, the source device establishes a quick connection with the target device based on the guidance information of the target device.

In the embodiment, through steps 301-305, the source device may acquire the guidance information of the target device, and the source device further actively establishes the quick connection with the target device based on the guidance information of the target device.

Figure 4:
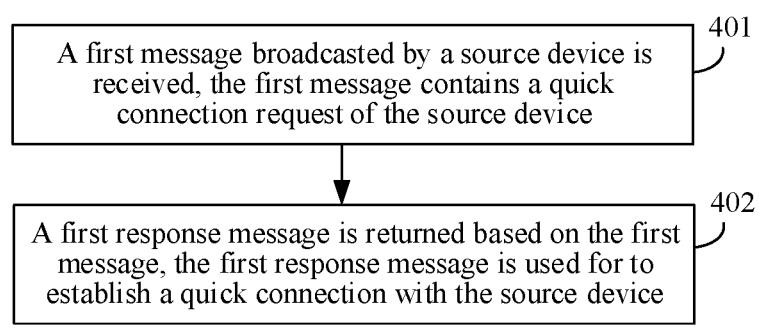
FIG. 4 is a flow chart of a method for establishing a quick connection between Internet of things devices according to an exemplary embodiment.

FIG. 4 is a flow chart of a method for establishing a quick connection between Internet of things devices according to an exemplary embodiment. The method for establishing the quick connection between the Internet of things devices may be applied to a target device. As shown in FIG. 4, the method for establishing the quick connection between the Internet of things devices includes the following steps 401-402.

In step 401, a first message broadcasted by a source device is received. The first message contains a quick connection request of the source device.

In step 402, a first response message is returned based on the first message. The first response message is used to establish a quick connection with the source device.

In an embodiment, the first response message may be used to acquire guidance information of the source device, which is not elaborated herein, reference may be made to the embodiment shown in FIG. 2.

In an embodiment, the first response message may further directly contain guidance information of the target device. In this way, the source device, upon receiving the first response message, directly parses the first response message to obtain the guidance information of the target device and establishes a quick connection with the target device based on the guidance information of the target device.

In an embodiment, the guidance information may be necessary information obtained based on a licensed frequency band-based cellular Internet of things technology and required by DPP authentication and configuration, for example, a public bootstrap key and/or a global operating class and/or a channel number list.

In an embodiment, the two devices required to establish a quick connection may execute a series of flows such as DPP authentication, DPP configuration and network access based on the guidance information, thereby establishing the quick connection.

An exemplary scenario is as shown in FIG. 1B. A scenario shown in FIG. 1B includes a cellular Internet of things base station 10, a source device (the source device may be an electronic device supporting the cellular Internet of things, for example, a smart phone and a tablet computer) 20 and a target device 30 (the target device may be an electronic device supporting the cellular Internet of things, for example, a smart phone, a tablet computer, a television and a humidifier, and a flat screen television is taken as a schematic example of the target device). There may be more than one target device. The source device 20, when a quick connection is required to be established, acquire a D2D resource from the cellular Internet of things base station 10 and further broadcasts a first message. Upon the first message is monitored, the target device 30 may return a first response message to implement guidance between the source device 20 and the target device 30 and further establish a quick connection.

According to the embodiment, through the above steps 401-402, when the source device broadcasts the first message containing the quick connection establishment request, the target device may return the first response message to the source device, to implement guidance between the source device and the target device and further establish a quick connection.

In an embodiment, the operation that the first response message is returned based on the first message includes an operation as follows.

The first response message used for acquiring guidance information of the source device is sent to the source device.

In an embodiment, the method further includes operations as follows.

A second response message returned by the source device based on the first response message is monitored.

The second response message is parsed to obtain guidance information of the source device.

A quick connection with the source device is established based on the guidance information of the source device.

In an embodiment, the operation that the first response message is returned based on the first message includes an operation as follows.

The first response message including the guidance information of the target device is sent to the source device. The guidance information of the target device is used by the source device to establish the quick connection with the target device.

About establishing the quick connection between the Internet of things devices, reference may be made to subsequent embodiments.

The technical solution provided in the embodiment of the present disclosure is described below in the embodiments.

Figure 5:
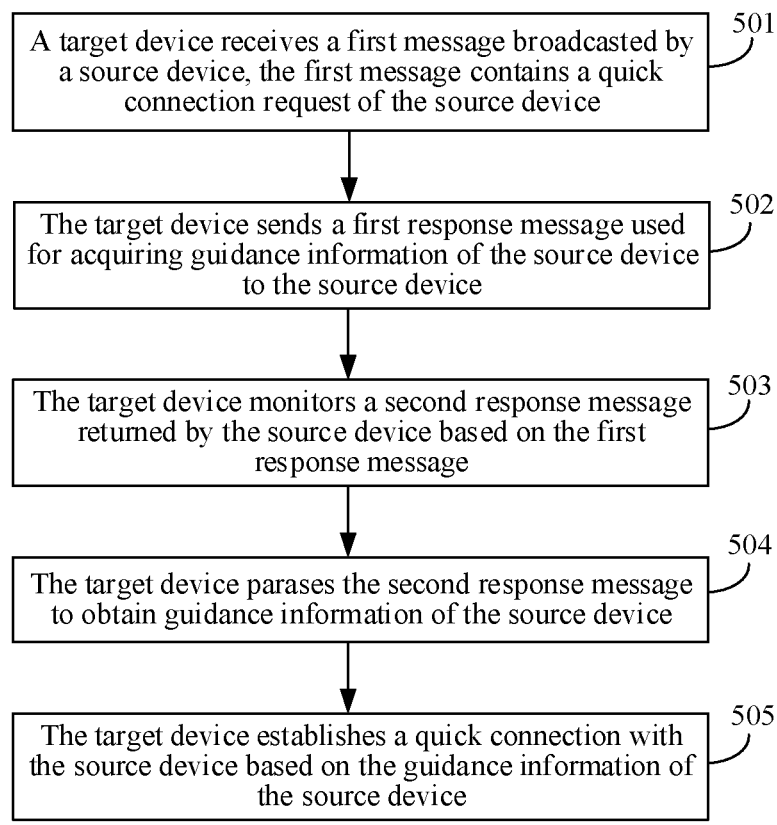
FIG. 5 is a flow chart of another method for establishing a quick connection between Internet of things devices according to an exemplary embodiment.

FIG. 5 is a flow chart of another method for establishing a quick connection between Internet of things devices according to an exemplary embodiment. In the embodiment, the above method according to the embodiment of the present disclosure is illustrated with taking a case that a target device acquires guidance information of a source device to establish a quick connection between the source device and the target device as an example. As shown in FIG. 5, the method includes the following steps 501 to 505.

In step 501, the target device receives a first message broadcasted by the source device. The first message contains a quick connection request of the source device.

In step 502, the target device sends a first response message used for acquiring guidance information of the source device to the source device.

In step 503, the target device monitors a second response message returned by the source device based on the first response message.

In step 504, the target device parses the second response message to obtain guidance information of the source device.

In step 505, the target device establishes a quick connection with the source device based on the guidance information of the source device.

In the embodiment, through steps 501-505, the target device may acquire the guidance information of the source device, and the target device further actively establishes a quick connection with the source device based on the guidance information of the source device.

Figure 6A:
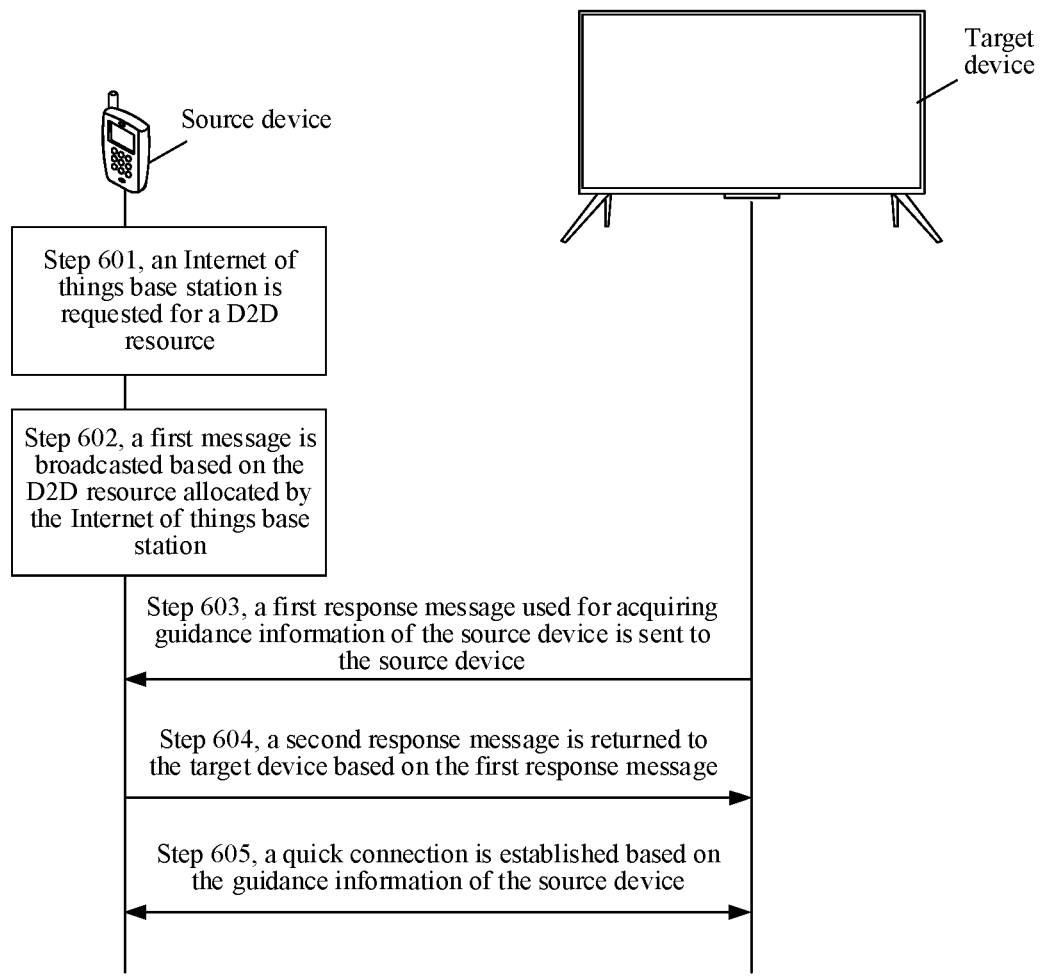
FIG. 6A is a flow chart of another method for establishing a quick connection between Internet of things devices according to an exemplary embodiment.
Figure 6B:
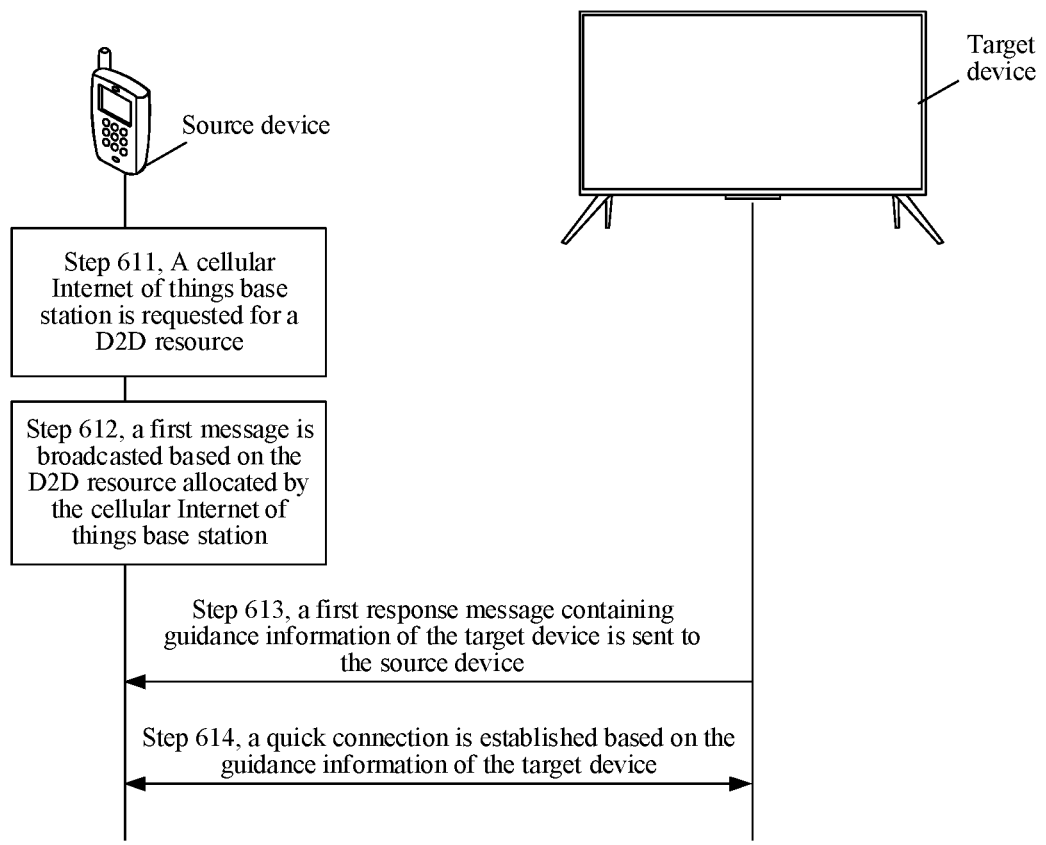
FIG. 6B is a flow chart of another method for establishing a quick connection between Internet of things devices according to an exemplary embodiment.

FIG. 6A is a flow chart of another method for establishing a quick connection between Internet of things devices according to an exemplary embodiment. FIG. 6B is a flow chart of another method of establishing a quick connection between Internet of things devices according to an exemplary embodiment. In the embodiment, the above method according to the embodiment of the present disclosure is illustrated with taking a case that a target device and a source device perform information interaction to establish a quick connection between the source device and the target device as an example. FIG. 6A shows a flow that the target device acquires guidance information of the source device to establish a quick connection, which includes the following steps 601 to 605.

In step 601, the source device, when a quick connection is required to be established, requests a cellular Internet of things base station for a D2D resource.

In step 602, the source device broadcasts a first message based on the D2D resource allocated by the cellular Internet of things base station.

In step 603, the target device sends a first response message used for acquiring guidance information of the source device to the source device.

In step 604, the source device returns a second response message to the target device based on the first response message. The second response message contains guidance information of the source device.

In step 605, the target device establishes a quick connection based on the guidance information of the source device.

FIG. 6B shows a flow that the source device acquires guidance information of the target device to establish a quick connection, which includes the following steps 611 to 614.

In step 611, the source device, when a quick connection is required to be established, requests the cellular Internet of things base station for a D2D resource.

In step 612, the source device broadcasts the first message based on the D2D resource allocated by the cellular Internet of things base station.

In step 613, the target device sends a first response message containing guidance information of the target device to the source device.

In step 614, the source device establishes a quick connection based on the guidance information of the target device.

In the embodiment, the source device, when a quick connection is required to be established, may broadcast a first message containing a quick connection request based on the D2D resource. When the first response message of the target device for the first message is monitored, the source device establishes a quick connection with the target device. Since the source device broadcasts the quick connection request through the D2D resource, the target device intended to establish a quick connection may further directly perform signaling interaction with the source device to implement guidance between the source device and the target device, and further establish a quick connection.

Figure 7:
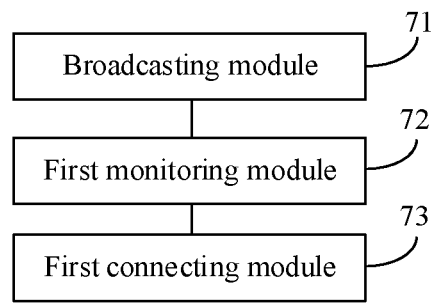
FIG. 7 is a block diagram of a device for establishing a quick connection between Internet of things devices according to an exemplary embodiment.

FIG. 7 is a block diagram of a device for establishing a quick connection between Internet of things devices according to an exemplary embodiment. The device is applied to a source device. As shown in FIG. 7, the device for establishing the quick connection between the Internet of things devices includes a broadcasting module 71, a first monitoring module 72 and a first connecting module 73.

The broadcasting module 71 is configured to, when a quick connection is required to be established, broadcast a first message based on a D2D resource. The first message contains a quick connection request of the source device.

The first monitoring module 72 is configured to monitor a first response message corresponding to the first message broadcasted by the broadcast module 71.

The first connecting module 73 is configured to establish a quick connection with a target device based on the first response message monitored by the first monitoring module 72.

Figure 8:
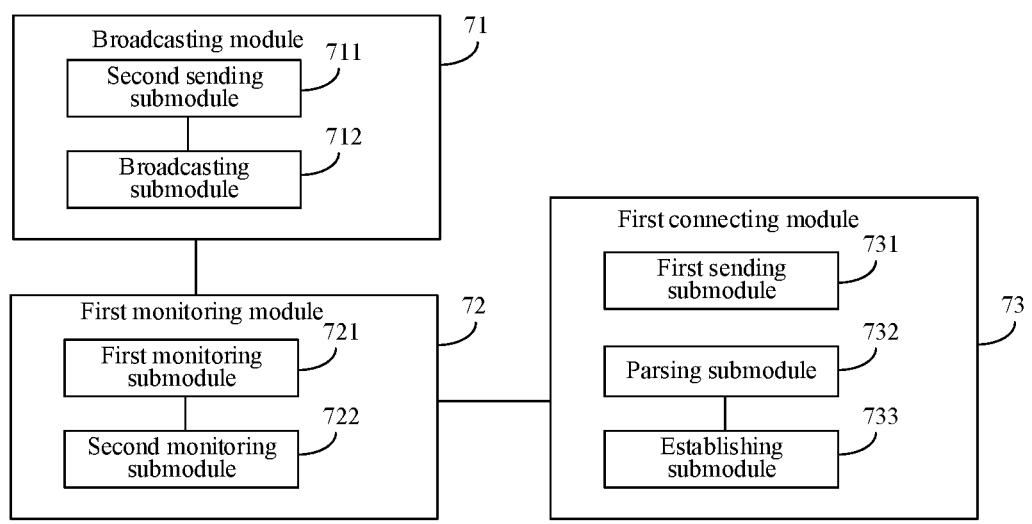
FIG. 8 is a block diagram of another device for establishing a quick connection between Internet of things devices according to an exemplary embodiment.

FIG. 8 is a block diagram of another device for establishing a quick connection between Internet of things devices according to an exemplary embodiment. As shown in FIG. 8, based on the embodiment shown in FIG. 7, the first monitoring module 72 in an embodiment includes a first monitoring submodule 721.

The first monitoring submodule 721 is configured to monitor a first response message which is sent by the target device based on the first message and is used for acquiring guidance information of the source device.

In an embodiment, the first connecting module 73 includes a first sending submodule 731.

The first sending submodule 731 is configured to send a second response message to the target device based on the first response message. The second response message contains guidance information of the source device.

In an embodiment, the first monitoring module 72 includes a second monitoring submodule 722.

The second monitoring submodule 722 is configured to monitor the first response message which is sent by the target device based on the first message and contains guidance information of the target device.

In an embodiment, the first connecting module 73 includes a parsing submodule 732 and an establishing submodule 733.

The parsing submodule 732 is configured to parse the first response message to obtain the guidance information of the target device.

The establishing submodule 733 is configured to establish a quick connection with the target device based on the guidance information of the target device obtained by parsing from the parsing submodule 732, In an embodiment, the first message contains device identification information of the target device with which the source device is to establish the quick connection.

In an embodiment, the broadcasting module 71 includes a second sending submodule 711 and a broadcasting submodule 712.

The second sending submodule 711 is configured to request a cellular Internet of things base station for a D2D resource.

The broadcasting submodule 712 is configured to broadcast the first message based on the D2D resource allocated by the cellular Internet of things base station.

Figure 9:
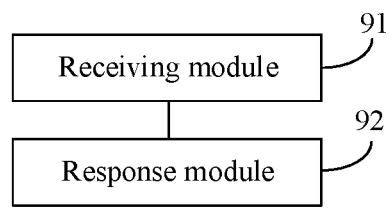
FIG. 9 is a block diagram of a device for establishing a quick connection between Internet of things devices according to an exemplary embodiment.

FIG. 9 is a block diagram of a device for establishing a quick connection between Internet of things devices according to an exemplary embodiment. The device is applied to a target device. As shown in FIG. 9, the device for establishing the quick connection between the Internet of things devices includes a receiving module 91 and a response module 92.

The receiving module 91 is configured to receive a first message broadcasted by a source device. The first message contains a quick connection request of the source device; and The response module 92 is configured to return a first response message based on the first message received by the receiving module. The first response message is used to establish a quick connection with the source device.

Figure 10:
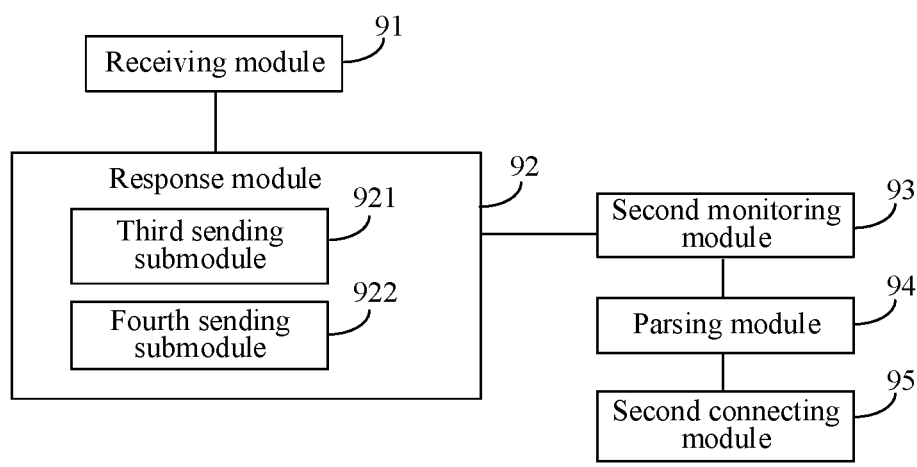
FIG. 10 is a block diagram of another device for establishing a quick connection between Internet of things devices according to an exemplary embodiment.

FIG. 10 is a block diagram of another device for establishing a quick connection between Internet of things devices according to an exemplary embodiment. As shown in FIG. 10, based on the embodiment shown in FIG. 9, the response module 92 in an embodiment includes a third sending submodule 921.

The third sending submodule 921 is configured to send a first response message used for acquiring guidance information of the source device to the source device.

In an embodiment, the device further includes a second monitoring module 93, a parsing module 94 and a second connecting module 95.

The second monitoring module 93 is configured to monitor a second response message returned by the source device based on the first response message.

The parsing module 94 is configured to parse the second response message monitored by the second monitoring module 93 to obtain guidance information of the source device.

The second connecting module 95 is configured to establish a quick connection with the source device based on the guidance information of the source device.

In an embodiment, the response module 92 includes a fourth sending submodule 922.

The fourth sending submodule 922 is configured to send a first response message containing guidance information of the target device to the source device. The guidance information of the target device is used by the source device to establish a quick connection with the target device.

For the device in the above embodiment, manners of performing operations in individual modules have been described in detail in the method embodiments, which are not elaborated herein.

Figure 11:
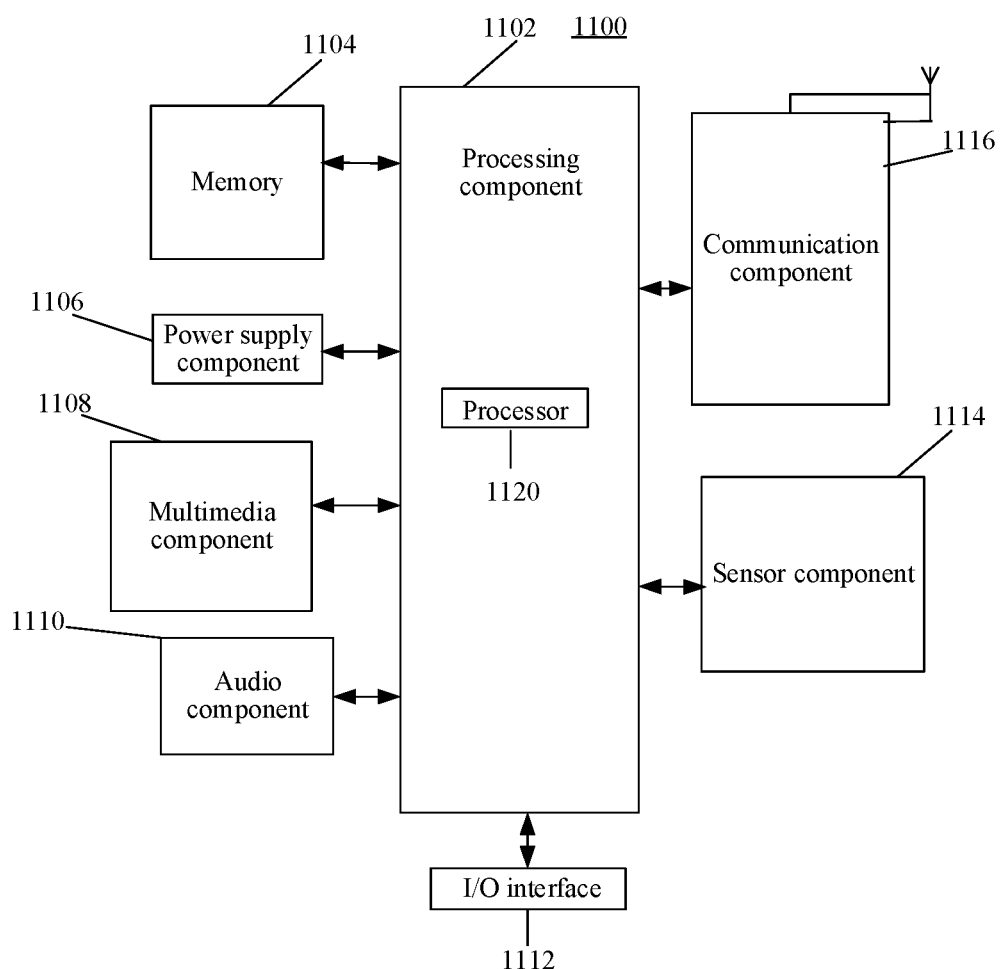
FIG. 11 is a block diagram of a device used for establishment of a quick connection between Internet of things devices according to an exemplary embodiment.

FIG. 11 is a block diagram of a device used for establishment of a quick connection between Internet of things devices according to an exemplary embodiment. For example, the device 1100 may be a source device and a target device, for example, a smart phone.

Referring to FIG. 11, the device 1100 may include one or more components of a processing component 1102, a memory 1104, a power supply component 1106, a multimedia component 1108, an audio component 1110, an Input/Output (I/O) interface 1112, a sensor component 1114 and a communication component 1116.

The processing component 1102 typically controls overall operations of the device 1100, such as the operations associated with display, telephone calls, data communications, camera operations and recording operations. The processing component 1102 may include one or more processors 1120 to execute instructions to perform all or a part of the steps in the abovementioned method. Moreover, the processing component 1102 may include one or more modules which facilitate interaction between the processing component 1102 and the other components. For instance, the processing component 1102 may include a multimedia module to facilitate interaction between the multimedia component 1108 and the processing component 1102.

The memory 1104 is configured to store various types of data to support the operation of the device 1100. Examples of such data include instructions, messages, pictures or the like for any application programs or methods operated on the device 1100. The memory 1104 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory and a magnetic or optical disk.

The power supply component 1106 supplies power for various components of the device 1100. The power supply component 1106 may include a power management system, one or more power supplies, and other components associated with generation, management and distribution of power for the device 1100.

The multimedia component 1108 includes a screen for providing an output interface between the device 1100 and a user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touches, sliding and gestures on the TP. The touch sensors may not only sense a boundary of a touch or sliding action but also detect a duration and a pressure associated with the touch or sliding action. In some embodiments, the multimedia component 1108 includes a front camera and/or a rear camera. The front camera and/or the rear camera may receive external multimedia data when the device 1100 is in an operation mode, such as a photographing mode or a video mode. Each of the front camera and the rear camera may be a fixed optical lens system or have focusing and optical zooming capabilities.

The audio component 1110 is configured to output and/or input an audio signal. For example, the audio component 1110 includes a microphone (MIC). The microphone is configured to receive an external audio signal in a case that the device 1100 is in the operation mode, such as a call mode, a recording mode and a voice recognition mode. The received audio signal may further be stored in the memory 1104 or sent through the communication component 1116. In some embodiments, the audio component 1110 further includes a speaker configured to output the audio signal.

The I/O interface 1112 provides an interface between the processing component 1102 and a peripheral interface module, and the peripheral interface module may be a keyboard, a click wheel, a button and the like. The button may include but be not limited to a home button, a volume button, a starting button and a locking button.

The sensor component 1114 includes one or more sensors configured to provide state assessment in various aspects for the device 1100. For instance, the sensor component 1114 may detect an on/off state of the device 1100 and relative positioning of components. The components may be for example a display and small keyboard of the device 1100, the sensor component 1114 may further detect a change in a position of the device 1100 or a component of the device 1100, whether the user is in contact with the device 1100, orientation or acceleration/deceleration of the device 1100 and a change in temperature of the device 1100. The sensor component 1114 may include a proximity sensor configured to detect presence of a nearby object without any physical contact. The sensor component 1114 may also include a light sensor, such as a complementary metal oxide semiconductor (CMOS) or charge coupled device (CCD) image sensor, which is applied for imaging. In some embodiments, the sensor component 1114 may also include an acceleration sensor, a gyroscope sensor, a magnetic sensor, a distance sensor, a pressure sensor or a temperature sensor.

The communication component 1116 is configured to facilitate wired or wireless communication between the device 1100 and other device. The device 1100 may access a communication-standard-based wireless network, such as a Wi-Fi network, a 2nd-Generation (2G) or 3rd-Generation (3G) network or a combination thereof. In an exemplary embodiment, the communication component 1116 receives a broadcasted signal or broadcasted associated information from an external broadcast management system through a broadcast channel. In an exemplary embodiment, the communication component 1116 further includes an NFC module to facilitate short-range communication. For example, the NFC module may be implemented based on radio frequency identification (RFID) technology, infrared data association (IrDA) technology, ultra-wideBand (UWB) technology, a bluetooth (BT) technology and another technology.

In an exemplary embodiment, the device 1100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above method for establishing a quick connection between Internet of things devices.

In an exemplary embodiment, a non-transitory computer-readable storage medium including an instruction is further provided, such as the memory 1104 including an instruction. The above instruction may be executed by the processor 1120 of the device 1100 to implement the abovementioned method. For example, the non-transitory computer-readable storage medium may be a ROM, a random access memory (RAM), a compact disc read-only memory (CD-ROM), a magnetic tape, a floppy disc, optical data storage equipment and the like.

With the non-transitory computer-readable storage medium, the instruction in the storage medium, when being executed by a processor of a device, enables the device to execute the above method for establishing a quick connection between Internet of things devices in the first aspect and the second aspect.

Other implementations of the present disclosure are apparent to those skilled in the art from consideration of the specification and practice of the present disclosure. This application is intended to cover any variations, usage or adaptations of the present disclosure, which conform to the general principles of the present disclosure and include general knowledge and conventional technical means in the art not disclosed in the present disclosure. The specification and the embodiments are only considered to be exemplary, and a scope and spirit of the present disclosure are indicated by the following claims.

It will be appreciated that the present disclosure is not limited to be in the exact construction that has been described above and shown in the accompanying drawings, and various modifications and changes may be made without departing from the scope thereof. The scope of the present disclosure is only limited by the appended claims.

What is claimed is:

1. A method for establishing a quick connection between Internet of things devices, applied to a source device and comprising:
   when the quick connection is requested to be established, broadcasting a first message based on a Device to Device (D2D) resource, wherein the first message comprises a quick connection request of the source device;
   monitoring a first response message corresponding to the first message; and
   establishing the quick connection with a target device based on the first response message,
   wherein monitoring the first response message corresponding to the first message comprises:
   monitoring the first response message sent by the target device based on the first message and used for acquiring guidance information of the source device, wherein the guidance information is necessary information required by device provisioning protocol (DPP) authentication and configuration.

2. The method of claim 1, wherein the establishing the quick connection with the target device based on the first response message comprises:
   sending a second response message to the target device based on the first response message, wherein the second response message comprises the guidance information of the source device.

3. The method of claim 1, wherein the first message comprises device identification information of the target device with which the source device is to establish the quick connection.

4. The method of claim 1, wherein the broadcasting the first message based on the D2D resource comprises:
   requesting a cellular Internet of things base station for the D2D resource; and
   broadcasting the first message based on the D2D resource allocated by the cellular Internet of things base station.

5. A method for establishing a quick connection between Internet of things devices, applied to a target device and comprising:
   receiving a first message broadcasted by a source device, wherein the first message comprises a quick connection request of the source device; and
   returning a first response message based on the first message, wherein the first response message is used to establish the quick connection with the source device,
   wherein returning the first response message based on the first message comprises:
   sending the first response message used for acquiring guidance information of the source device to the source device, wherein the guidance information is necessary information required by device provisioning protocol (DPP) authentication and configuration.

6. The method of claim 5, further comprising:
monitoring a second response message returned by the source device based on the first response message;
parsing the second response message to obtain the guidance information of the source device; and
establishing the quick connection with the source device based on the guidance information of the source device.

7. A user device, comprising:
a processor;
a memory configured to store a processor-executable instruction; and
an input/output interface,
wherein the processor is configured to:
when a quick connection is required to be established, control the input/output interface to broadcast a first message based on a Device to Device (D2D) resource, wherein the first message comprises a quick connection request of a source device;
monitor a first response message corresponding to the first message; and
establish the quick connection with a target device based on the first response message,
wherein the processor is further configured to:
monitor the first response message sent by the target device based on the first message and used for acquiring guidance information of the source device, wherein the guidance information is necessary information required by device provisioning protocol (DPP) authentication and configuration.

8. The user device of claim 7, wherein the processor is further configured to:
control the input/output interface to send a second response message to the target device based on the first response message, wherein the second response message comprises the guidance information of the source device.

9. The user device of claim 7, wherein the first message comprises device identification information of the target device with which the source device is to establish the quick connection.

10. The user device of claim 7, wherein the processor is further configured to:
request a cellular Internet of things base station for the D2D resource; and
control the input/output interface to broadcast the first message based on the D2D resource allocated by the cellular Internet of things base station.

* * * * *